June 28, 1966 A. W. CLOSSON, JR., ET AL 3,257,743
COUNTER STIFFENER AND LINING MATERIAL
Filed Dec. 19, 1960
FIG. 1
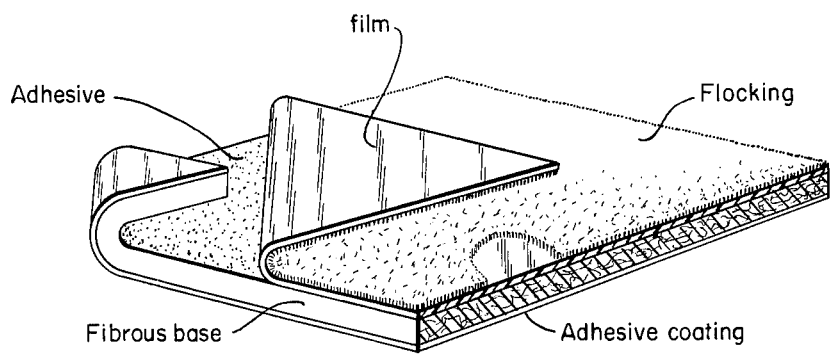
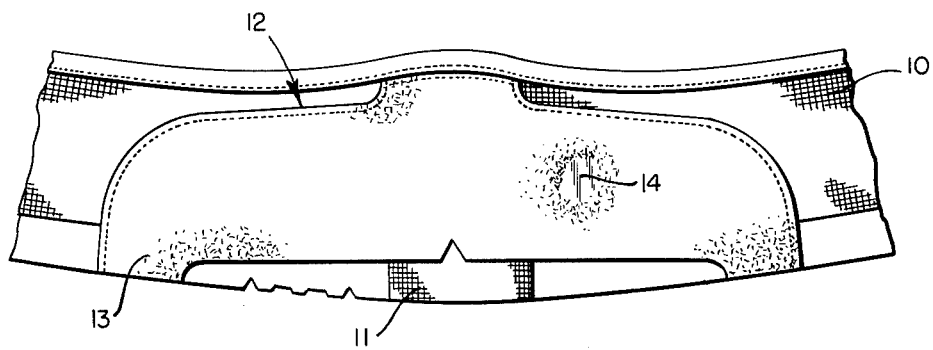
FIG. 2
INVENTORS
ADDISON W. CLOSSON, JR.
J. HAROLD GAQUIN
BY
Kenway, Jenney & Hildreth
ATTORNEYS

3,257,743
COUNTER STIFFENER AND LINING MATERIAL
Addison W. Closson, Jr., Cambridge, and John Harold Gaquin, Haverhill, Mass., assignors to Beckwith-Arden Inc., Watertown, Mass., a corporation of New Hampshire
Filed Dec. 19, 1960, Ser. No. 76,612
1 Claim. (Cl. 36—69)

This invention comprises a new and improved counter stiffener and lining material for shoes which is at the same time exceptionally strong and tough for long service wear and thin enough to make skiving unnecessary. This novel material is characterized by a base ply of fibrous material such as paper stock impregnated with a stiffening component such as a thermoplastic or thermosetting resinous compound or with a synthetic rubber. An important feature of the material comprises a facing ply which includes a thin film of polyethylene compound flocked on its surface which is exposed within the shoe next to the foot of the wearer. The facing ply is united to the fibrous base ply by suitable adhesive and preferably the outer face of the base ply carries a coating of dry but activatable cement. The resultant material is tough and flexible so that it will not crack in being conformed to the contour of the last or in long service. It may advantageously be used as a substitute for the usual textile lining and separate counter stiffener. The flocked surface presents an attractive appearance of texture which is comfortable to the wearer and moreover in case the flocking becomes worn there is then exposed only the very smooth surface of the polyethylene film and this also is extremely comfortable for the wearer.

These and other features of the invention will be best understood and appreciated from the following description of a preferred embodiment thereof selected for purpose of illustration and shown in the accompanying drawings in which:

FIG. 1 is a view in perspective of a piece of the material shown on a greatly enlarged scale, and FIG. 2 is a plan view showing the material as assembled in the counter portion of an upper.

The material as shown in FIG. 1 comprises a fibrous base ply that for example may comprise approximately 90% paper fibre and 10% latex, together with a stiffening component such as polyethylene and other thermoplastic or thermosetting resin thus making a tough pliable ply of less thickness than a textile ply of comparable characteristic, a difference in thickness which results in obviating the skiving operation which would otherwise be necessary in preparing the material for incorporation in a shoe.

The facing ply of the material includes a thin thermoplastic film of Mylar (a trade name for polyethylene terephthalate) or polyethylene or the like. This film in practice may be .005 inch or thereabout in thickness and as shown in FIG. 1 is coated with flocking upon its exposed surface. The flocking may be applied to the polyethylene film by any well known commercial process. The flocked polyethylene sheet may be permanently secured in face to face contact with the fibrous base ply by a coating of latex cement which of course is entirely consistent with the desirable flexible character of the product.

Finally, the sheet material may be coated upon the exposed face of the fibrous base with a coating of dry but activatable cement which is useful in securing the material to the inner face of the shoe upper.

As shown in FIG. 2 the material is cut or died out in counter formation 12 and placed symmetrically within the counter portion 10 of a shoe upper with back seam reinforcement tape 11. The flocked surface 13 of the counter 12 is exposed within the upper for contact with the foot of the wearer and in the spot 14 the flocking has been removed to show the underlying smooth and glossy surface of the polyethylene film. Some difficulty has been found in selecting a suitable adhesive for uniting the polyethylene film to the base ply, but epoxy resins or epoxy resins compounded with latex will serve the purpose.

While the employment of a fibrous base ply is advantageous for reasons already explained it is believed that a flocked polyethylene ply has not heretofore been combined with a thin base ply of textile material or other material carrying a stiffening component and being suitable for producing self-stiffening counter lining of the type herein disclosed.

Having thus disclosed our invention and described in detail an illustrative embodiment thereof, we claim as new and desire to secure by Letters Patent:

A counter stiffening lining for shoes comprising a thin fibrous base ply consisting of paper fibre impregnated with thermoplastic resin as a stiffening component and being of less thickness than a textile ply, a facing ply including a thin tough polyethylene film approximately .005 inch in thickness and which is directly flocked on its exposed face for contact with the foot of the wearer and secured at its inner face by latex cement to the resin-stiffened base ply, and an adhesive coating upon the exposed face of the base ply, the lining as a whole being so thin as to require no skiving when incorporated in a shoe upper.

References Cited by the Examiner
UNITED STATES PATENTS

| | | | |
|---|---|---|---|
| 1,905,363 | 4/1933 | Bohlin | 117—33 |
| 2,383,598 | 8/1945 | Glidden. | |
| 2,567,327 | 9/1951 | Ewing | 117—33 |
| 2,576,276 | 11/1951 | Berglund. | |
| 2,619,441 | 11/1952 | Levy | 156—279 |
| 2,697,058 | 12/1952 | Lasak. | |
| 2,713,547 | 7/1955 | Fredrick | 117—33 |
| 2,715,074 | 8/1955 | Hirschberger | 154—123 |
| 2,723,468 | 11/1955 | Marcy | 154—46 |
| 2,734,289 | 2/1956 | Heaton et al. | 36—77 |
| 2,758,045 | 8/1956 | Heaton et al. | 36—77 |
| 3,030,223 | 4/1962 | Alstad et al. | 117—26 |
| 3,043,669 | 7/1962 | Charles | 117—33 |

FOREIGN PATENTS 521,477  2/1956  Canada.

EARL M. BERGERT, *Primary Examiner.*

CARL F. KRAFFT, *Examiner.*

ALEXANDER WYMAN, C. STEIN, R. J. ROCHE,
*Assistant Examiners.*